(12) United States Patent
Dharmadhikari et al.

(10) Patent No.: US 9,197,490 B2
(45) Date of Patent: Nov. 24, 2015

(54) SYSTEM AND METHOD FOR PROVIDING REMOTE MANAGEMENT OF A SWITCHING DEVICE

(71) Applicant: DELL PRODUCTS L.P., Round Rock, TX (US)

(72) Inventors: Vivek Dharmadhikari, San Jose, CA (US); Haresh K. Shah, Los Altos Hills, CA (US)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 13/645,191

(22) Filed: Oct. 4, 2012

(65) Prior Publication Data
US 2014/0098821 A1    Apr. 10, 2014

(51) Int. Cl.
*H04L 12/04*    (2006.01)
*H04L 12/24*    (2006.01)

(52) U.S. Cl.
CPC .................................. *H04L 41/04* (2013.01)

(58) Field of Classification Search
CPC .......... H04L 41/24; H04L 41/26; H04L 43/08
USPC .................... 370/241.1; 709/223, 253, 217
See application file for complete search history.

(56) References Cited

U.S. PATENT DOCUMENTS

| | | | |
|---|---|---|---|
| 7,424,419 B1 * | 9/2008 | Fike et al. ....................... | 703/23 |
| 7,668,203 B1 | 2/2010 | Pannell et al. | |
| 9,032,504 B2 | 5/2015 | Dharmadhikari et al. | |
| 2004/0078456 A1 * | 4/2004 | Kennedy et al. ............... | 709/223 |
| 2006/0168099 A1 * | 7/2006 | Diamant ....................... | 709/217 |
| 2007/0094426 A1 | 4/2007 | Chiang et al. | |
| 2009/0080419 A1 | 3/2009 | Kutch | |
| 2010/0192218 A1 | 7/2010 | Shah et al. | |
| 2011/0040917 A1 | 2/2011 | Lambert et al. | |
| 2011/0307639 A1 | 12/2011 | Dai | |
| 2012/0163388 A1 | 6/2012 | Goel et al. | |
| 2013/0173810 A1 | 7/2013 | Subramaniam | |
| 2013/0262642 A1 * | 10/2013 | Kutch .......................... | 709/223 |
| 2014/0115137 A1 | 4/2014 | Keisam | |
| 2014/0165183 A1 | 6/2014 | Dharmadhikari et al. | |

OTHER PUBLICATIONS

Intel® Sideband Technology: An Overview of the Intel Server Manageability Interfaces, Jul. 2009, 86 pp.
AlliedWare OS Software Reference for Software Version 2.9.1, chapter 8, 2006, 56 pp.

* cited by examiner

*Primary Examiner* — Albert T Chou
(74) *Attorney, Agent, or Firm* — Haynes and Boone, LLP

(57) ABSTRACT

An information handling system is provided. The information handling system includes at least one network switch. The at least one network switch includes a network access port receiving network packets including management information at least one processing unit, the at least one processing unit transmitting and receiving serial information. The at least one network switch also includes a baseband management controller coupled between the network access port and the at least one processing unit, the baseband management controller converting the serial information into network information and converting the network packets into serial information and a remote management terminal coupled to the at least one network switch, the remote management terminal transmitting the network packets including management information to the network switch for remotely managing the network switch.

16 Claims, 6 Drawing Sheets

SYSTEM AND METHOD FOR PROVIDING REMOTE MANAGEMENT OF A SWITCHING DEVICE

BACKGROUND

1. Technical Field

The present disclosure is related to systems and methods for managing network switching devices. In particular, embodiments disclosed herein are related to systems and methods for providing remote management to a switching device.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include multiple components that require management. However, it is difficult for a user or administrator to have physical access to the information handling devices in the system and manage the devices. What is needed is a system and method for providing remote management of an information handling device, in particular, a switching device.

SUMMARY

Consistent with some embodiments, there is provided an information handling system. The information handling system includes at least one network switch. The at least one network switch includes a network access port receiving network packets including management information at least one processing unit, the at least one processing unit transmitting and receiving serial information. The at least one network switch also includes a baseband management controller coupled between the network access port and the at least one processing unit, the baseband management controller converting the serial information into network information and converting the network packets into serial information and a remote management terminal coupled to the at least one network switch, the remote management terminal transmitting the network packets including management information to the network switch for remotely managing the network switch.

Consistent with some embodiments, there is also provided a non-transitory computer-readable medium having instructions for execution by one or more processors that, when executed, cause the one or more processors to perform a method for providing remote management access to a level 2 (L2) switch. The method includes receiving a request to establish a remote management session, packaging information from one or more processing units of the L2 switch into network packets, transmitting the network packets over an internet protocol, receiving management information packets, unpacking management information from the received management information packets, converting the management information into serial management information, and providing the serial management information to the one or more processing units.

These and other embodiments will be described in further detail below with respect to the following figures.

Figure 1:
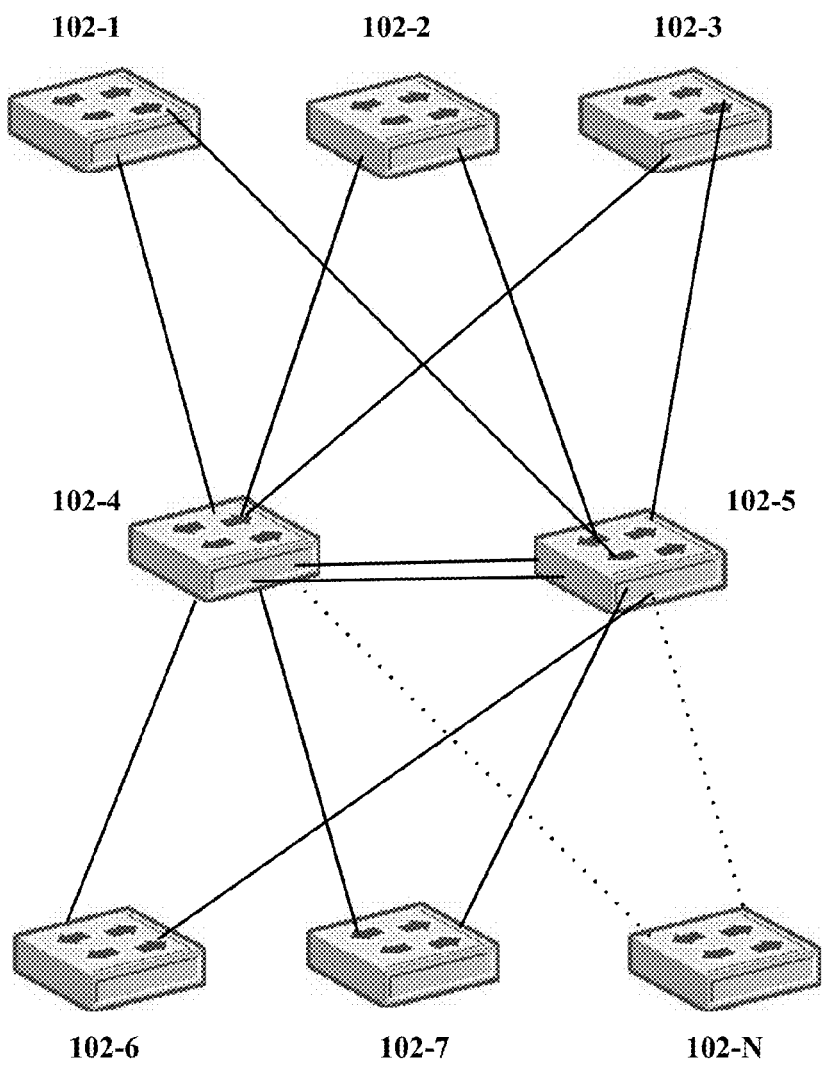
FIG. 1 shows an information handling system consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 shows an information handling system consistent with some embodiments. As shown in FIG. 1, information handling system 100 includes a plurality of devices 102-1-102-N coupled to each other in a linked or aggregated arrangement. Consistent with some embodiments, devices 102-1-102-N may include any appropriate combination of hardware and/or software having one or more processors and capable of reading instructions stored on a non-transitory machine-readable medium for execution by the one or more processors. According to some embodiments, devices 102-1-102-N (collectively referred to as devices 102) may correspond to a network switch and, in some embodiment, may correspond to a level two (L2) switch, a level three (L3) switch, or a combination switch capable of performing both L2 and L3 switching. Consistent with some embodiments devices 102-1-102-N include a machine-readable medium, such as a memory (not shown) that includes instructions for execution by one or more processors (not shown) for causing devices 102-1-102-N to perform specific tasks. For example, such instructions may include handling and routing information. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Consistent with some embodiments, devices 102-1 to 102-N are coupled together to transmit information between each other and to other devices coupled to devices 102-1-102-N. System 100 may represent a local area network, a wide area network, or a link aggregation group. Devices 102 may need to be accessed by a user, who may be an operator or an administrator. In order to access devices 102, devices 102 usually have a console located on a face of the device having ports for accessing and communicating with devices 102. Such ports may include a universal serial bus (USB) port, an Institute of Electrical and Electronics Engineers (IEEE) 1394 port, a registered jack (RJ) 45 port, or an Electronics Industries Association (EIA) standard Radio Sector (RS) 232 port. Depending on the requirements of devices 102, other ports may be found on a console.

Figure 2:
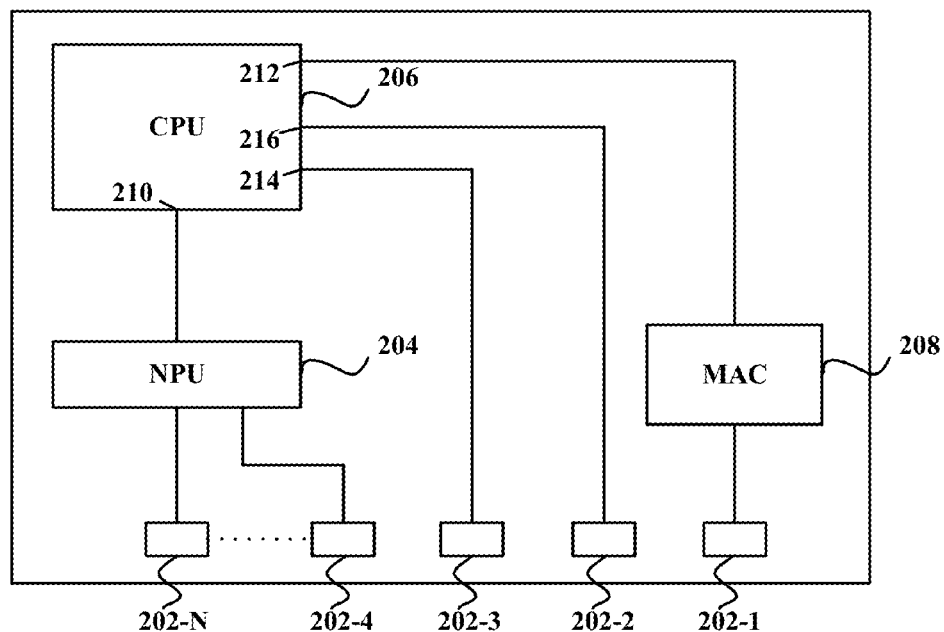
FIG. 2 is a diagram illustrating an information handling device, consistent with some embodiments.

FIG. 2 is a diagram illustrating an information handling device, consistent with some embodiments. Device 200 may correspond to any of devices 102 shown in FIG. 1 as part of information handling system 100. Moreover, device 200 may correspond to a network switching device, such as a level two (L2) switch or switching device, a level three (L3) switch or switching device, or a combination switch or switch or switching device capable of performing both L2 and L3 switching. As shown in FIG. 2, device 200 includes a plurality of access ports 202-1-202-N (collectively referred to as ports 202). Access ports 202-4-202-N are coupled to a network processing unit (NPU) 204, access ports 202-3 and 202-2 are coupled to a central processing unit 206, and access port 202-5 is coupled to a media access controller (MAC) controller circuit 208. Consistent with some embodiments, access ports 202-4-202-N may be ports for servers coupled to device 200, access port 202-3 may correspond to a USB port, and access ports 202-1 and 202-2 may correspond to RJ45 ports. The particular designation and coupling of ports 202 is not limiting and is shown for example. Other ports and couplings may be used in device 200 based on the function of device 200.

According to some embodiments, central processing unit (CPU) 206 may correspond to a host CPU of device 200 and may include a first peripheral component interconnect express (PCIe) port 210 coupled to network processor unit 204 and a second PCIe port 212 coupled to MAC controller 208 for transmitting and receiving signals according to the PCIe standard. CPU 206 may also include a USB port 214 coupled to access port 202-3 for transmitting and receiving signals according to the USB standard. CPU 206 may further includes a universal asynchronous receiver/transmitter (UART) port 216 coupled to access port 202-2 for receiving signals from and transmitting signals to access port 202-2. Consistent with some embodiments, access ports 202-1-202-3 are used for remote management of device 200 by remote devices coupled to device 200 through access ports 202-1-202-3. For example, according to some embodiments, one or more terminal servers may be coupled to device 200 through at least one of access ports 202-1 and 202-2.

Figure 3:
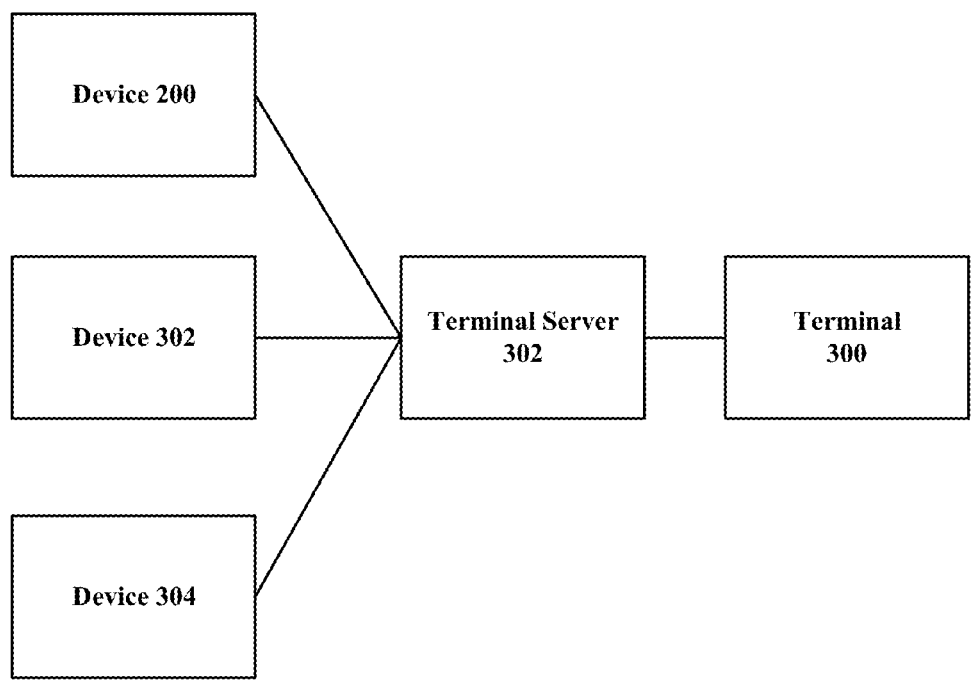
FIG. 3 is a diagram illustrating an information handling system including a terminal server, consistent with some embodiments.

FIG. 3 is a diagram illustrating an information handling system including a terminal server. As shown in FIG. 3, system 300 includes a terminal server 302 that is coupled to device 200 and other information handling devices 302 and 304. Terminal server 302 is further coupled to a terminal 306, which may correspond to a computing device having an input and a display. The coupling to terminal 306 may be remote or direct. Terminal server 302 may be used to provide remote management capabilities to devices 200, 302 and 306. A user, such as an administrator, may connect to terminal server 302 using terminal 306, and remotely manage devices 200, 302 and 304 using terminal 306. Terminal server 302 may be coupled to device 200 through either access port 202-1 or 202-2 and provide serial data to device 200 to provide management of device 200.

Although terminal server 302 allows for the remote management of devices 200, 302, and 304, terminal server 302 must be maintained and supported. Moreover, there is often licensing fees that must be paid in order to use software that is executing on terminal server and used for remote terminal management.

Figure 4:
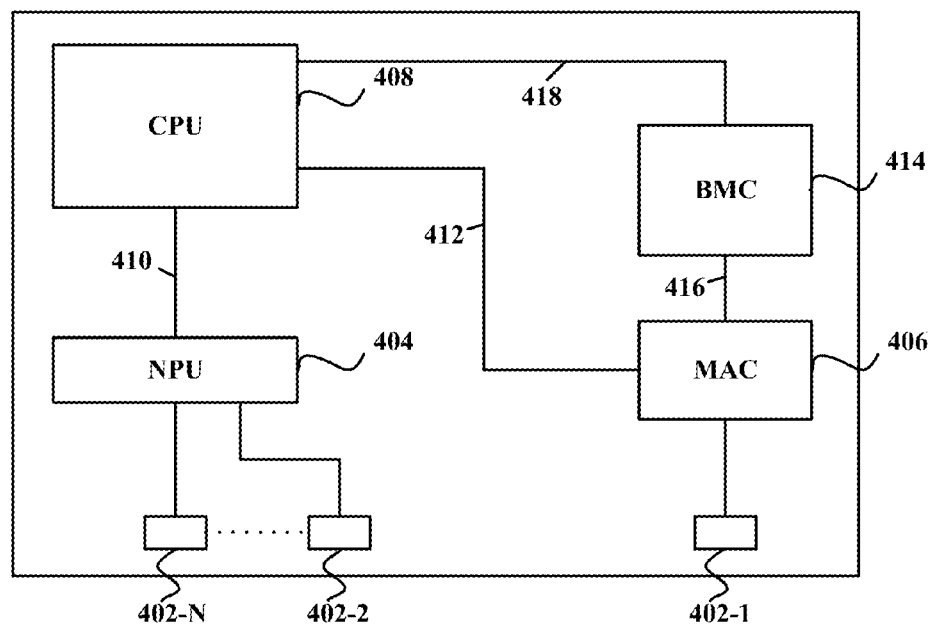
FIG. 4 is a diagram illustrating an information handling device, consistent with some embodiments.

FIG. 4 is a diagram illustrating an information handling device, consistent with some embodiments. Consistent with some embodiments, device 400 may correspond to a level two (L2) switch or switching device, a level three (L3) switch or switching device, or a combination switch or switch or switching device capable of performing both L2 and L3 switching. As shown in FIG. 4, device 400 is similar to device 200, but has a reduced number of access ports. Moreover, device 400 uses the Intelligent Platform Management Interface (IPMI) specification for providing remote management. IPMI is a message-based, hardware-level interface specification that operates independently of the operating system and allows users such as administrators to manage a system remotely in the absence of an operating system or the system management software. As a result of using the IPMI specification, device 400 eliminates the need for terminal server 302 for providing remote management capabilities to device 400.

Returning to FIG. 4, device 400 may correspond to any of devices 102 shown in FIG. 1 as part of information handling system 100. Device may also correspond to any of devices 302 or 304, shown in FIG. 3. As shown in FIG. 4, device 400 includes a plurality of access ports 402-1-402-N (collectively referred to as ports 402). Access ports 402-2-402-N are coupled to a network processing unit (NPU) 404, and access port 402-1 is coupled to a media access controller (MAC) controller circuit 406. As further shown in FIG. 4, device 400 includes a central processing unit (CPU) 408 that may correspond to a host CPU of device 400 and may include a first PCIe port 410 coupled to network processor unit 404 and a second PCIe port 412 coupled to MAC controller 406 for transmitting and receiving information according to the PCIe standard. Consistent with some embodiments, access ports 402-2-402-N may be ports for servers coupled to device 400, and access port 402-1 may correspond to an RJ45 port. The particular designation and coupling of ports 402 is not limiting and is shown for example. Other ports and couplings may be used in device 400 based on the function of device 400.

Device 400 also includes a baseband management controller (BMC) 414 that is coupled to MAC controller 406 and CPU 408. BMC 414 is a microcontroller that provides management capabilities for device 400 according to the IPMI standard. According to some embodiments, BMC 414 is capable of implementing serial over local area network (LAN) (SOL) capabilities such that the serial input and output of a serial port, such as access port 402-1, can be redirected over the internet according to an internet protocol. According to some embodiments, BMC 414 may be capable of packaging serial data into network packets, such as user datagram protocol (UDP) network packets. Returning to FIG. 4, BMC 414 is coupled to MAC 406 via a side-band coupling 416 and is coupled to CPU 408 via a serial coupling 418. Consistent with some embodiments, information between BMC 414 and MAC controller 406 may be correspond to the Reduced Media Independent Interface (RMII) standard and information between BMC 414 and CPU 408 may correspond to the UART standard. Further consistent with some embodiments, BMC 414 is powered by a separate, backup power supply (not shown) than CPU 408 and, thus, a user is capable of still accessing and managing device 400 even if device 400 is currently not receiving power. Consistent with some embodiments, the backup power supply may be available even if the main power supply powering device 400 and CPU 408 is cut or disabled such that BMC 414 can continue to operate.

In operation, an user at a terminal may transmit IPMI management information over internet protocol (IP) to device 400. This IPMI information may be packaged as UDP network packets and received at access port 402-1 and sent to MAC controller 406. MAC controller 406 will then analyze the MAC address of the received network packets and route over side-band coupling 416 to BMC 414. BMC 414 unpacks the IPMI information from the UDP network packets and formats them to a serial format for transmission to CPU 408 over serial coupling 418. Similarly, CPU 408 sends serial information over serial coupling 418, which are received by BMC 414 and packaged into UDP network packets having certain headers identifying, for example, the IP address of the terminal. The UDP network packets are sent to MAC controller 406 where they are routed to the terminal according to the IP address of the terminal over access port 402-1. Consequently, a user such as an administrator is capable of managing device 400 remotely using a terminal without the need for a terminal server. By eliminating a terminal server, a user or administrator may directly access device 400, which provides cost savings with respect to the maintenance, support and licensing fees that would normally be associated with operating a terminal server. Moreover, by eliminating extra access ports on a face of a device, such as ports 202-3 and 202-2 shown in FIG. 2, additional data ports or other features may be added to a face of device 400. Further, by using SOL to remotely manage device 400, additional cabling associated with the extra access ports and coupling device 400 to a terminal server can be eliminated thus reducing cable clutter.

Figure 5:
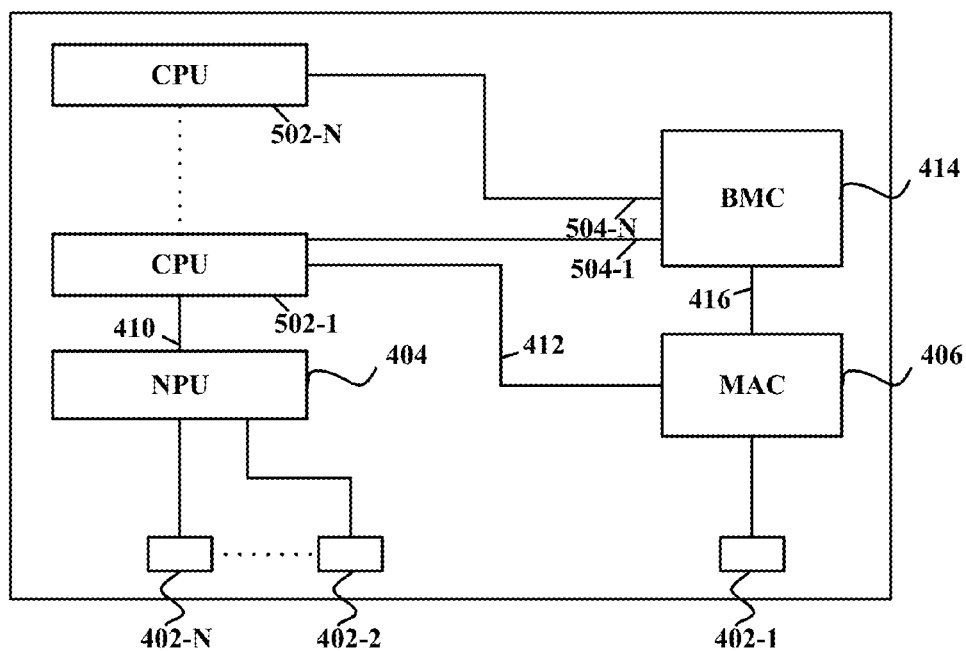
FIG. 5 is a diagram illustrating an information handling device having multiple processing units, consistent with some embodiments.

Using a BMC to provide SOL and remote management of a device can be extended to devices having multiple processors for controlling. FIG. 5 is a diagram illustrating an information handling device having multiple processing units, consistent with some embodiments. Device 500 may correspond to a L2 switch or switching device. Further, device 500 may also correspond to device 302 or 304 shown in FIG. 3. As shown in FIG. 5, device 500 includes the same components and couplings as FIG. 4, which will not be described again here. However, device 500 includes multiple processing units or processors 502-1-502-N which are coupled to BMC 414 and access ports 402-2-402-N. Processing units 502-1-502-N may correspond to a fiber channel over Ethernet (FCoE) CPU and a host CPU, for example.

Returning to FIG. 5, processing units 502-1-502-N are each coupled to BMC 414 over a serial coupling 504-1-504-N. The number of processing unites 502-1-502-N that may be supported in device 500 are limited by the number of ports available on BMC for coupling to processing units 502-1-502-N. In operation, an user at a terminal may transmit IPMI management information over internet protocol (IP) to device 500. This IPMI management information is packaged as UDP network packets and received at access port 402-1 and sent to MAC controller 406. MAC controller 406 will then analyze the MAC address of the received network packets and route over side-band coupling 416 to BMC 414. BMC 414 unpacks the IPMI information from the UDP network packets and formats them to a serial format for transmission to a particular processing unit 502-1-502-N designated in the UDP network packet over serial coupling 504-1-504-N. Similarly, processing units 502-1-502-N send serial information over serial coupling 504-1-504-N which is received by BMC 414 and packaged into UDP network packets having certain headers identifying, for example, the IP address of the terminal. The UDP network packets are sent to MAC controller 406 where they are routed to the terminal according to the IP address of the terminal over access port 402-1. Consequently, a user such as an administrator is capable of managing device 500 having multiple processing units remotely using a terminal without the need for a terminal server.

Figure 6:
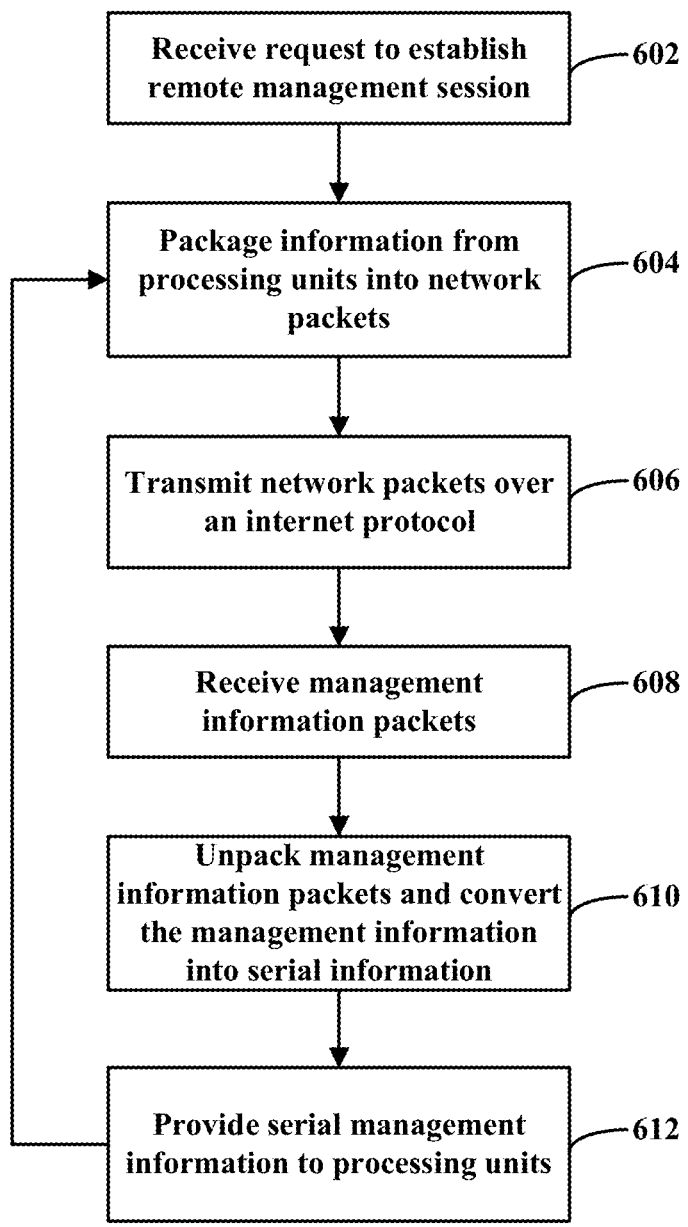
FIG. 6 is a flowchart illustrating a method for providing remote management access to a device such as a L2 switch, consistent with some embodiments.

FIG. 6 is a flowchart illustrating a method for providing remote management access to a device such as a L2 switch, consistent with some embodiments. For the purpose of illustration, FIG. 6 will be described with reference to FIGS. 4 and 5. Method 600 may be embodied in computer-readable instructions for execution by one or more processors in device 400 and/or 500, including BMC 414. As shown in FIG. 6, method 600 begins when device 400 receives a request to establish a remote management session (602). The request to establish a remote management session may be received from a remote terminal, such as terminal 306 shown in FIG. 3. Moreover, the request may be a UDP network packet received by access port 402-1. Device 400 then packages information from one or more processing units 408 or 502-2-502-N into network packets for transmission over an IP protocol (604). Consistent with some embodiments, BMC 414 receives the information over a serial coupling 418 or 504-2-504-N and packages the information from one or more processing units 408 or 502-2-502-N into UDP network packets. The information may correspond to data from one or more processing units 408 or 502-2-502-N. The network packets are transmitted from device 400 over an internet protocol (606). According to some embodiments, the UDP network packets are transmitted from device through access port 402-1. Device 400 then receives management information packets (608). The management information packets may be received at access port 402-1 and be from a remote terminal. Device 400 then unpacks the management information from the packets and converts the management information into serial information (610). Consistent with some embodiments, MAC controller 406 receives the management information packets from access port 402-1 and transmits the packets to BMC over a side-band coupling. Further consistent with some embodiments, BMC 414 unpacks the management information from the packets and converts the management information into serial information. Device 400 then provides the serial management information to one or more processing units 408 or 502-1-502-N (612). Consistent with some embodiments, steps 604-612 may be repeated until the remote management session is terminated. According to some embodiments, the remote management session may be terminated by the user or administrator.

Consistent with embodiments described herein, there is provided systems and methods for providing remote management capabilities for information handling devices such as switching devices that eliminate the need for terminal servers and the costs associated therewith. Moreover, the systems and methods described herein provide information handling devices such as switching devices that can save space by eliminating unnecessary serial ports. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
   at least one network switch, the at least one network switch comprising:
      a network processing unit (NPU);
      a media access controller (MAC) independent of the NPU;
      at least one port configured to couple to another network switch;
      a network access port independent of the at least one port receiving network packets that include management information;
      a plurality of central processing units (CPUs) coupled to the at least one port through the NPU; and
      a baseband management controller coupled to the network access port through the MAC and coupled to a serial port of each of the plurality of CPUs, the baseband management controller converting the network packets into serial information and transmitting the serial information to a particular CPU among the plurality of CPUs, the particular CPU being designated in the network packet; and
   a remote management terminal coupled to the network access port of at least one network switch, the remote management terminal transmitting the network packets that include management information to the network switch for remotely managing the network switch, the remote management terminal being operable by a user.

2. The information handling system according to claim 1, wherein the at least one network switch comprises a level 2 (L2) switch.

3. The information handling system according to claim 1, wherein the network access port comprises a single network access port.

4. The information handling system according to claim 1, wherein the plurality of CPUs comprise a host central processing unit and a fiber channel over Ethernet central processing unit.

5. The information handling system according to claim 1 wherein the baseband management controller is directly coupled to the plurality of CPUs.

6. The information handling system according to claim 1 wherein the plurality of CPUs are configured to receive power from a first power supply and the baseband management controller is configured to receive power from a second power supply independent of the first power supply, and wherein the remote management terminal is configured to remotely manage the network switch when the plurality of CPUs are powered off.

7. A level 2 (L2) network switch having remote management capabilities, comprising:
   a network processing unit (NPU);
   a media access controller (MAC) independent of the NPU;
   at least one port configured to couple to another network switch;
   a network access port independent of the at least one port receiving network packets that include management information for remotely managing the L2 network switch from a user operable remote management terminal coupled to the network access port, the remote management terminal transmitting the network packets that include management information to the network switch for remotely managing the network switch;
   a plurality of central processing units (CPUs) coupled to the at least one port through the NPU; and
   a baseband management controller coupled to the network access port through the MAC and coupled to a serial port of each of the plurality of CPUs, the baseband management controller converting the network packets into serial information and transmitting the serial information to a particular CPU among the plurality of CPUs, the particular CPU being designated in the network packet.

8. The L2 network switch according to claim 5, wherein the network access port comprises a single network access port.

9. The L2 network switch according to claim 7, wherein the plurality of CPUs comprise a host central processing unit and a fiber channel over Ethernet central processing unit.

10. The L2 network switch according to claim 7, wherein the management information includes Intelligent Platform Management Interface (IPMI) management messages.

11. The L2 network switch according to claim 7 wherein the baseband management controller is directly coupled to the plurality of CPUs.

12. A method for providing remote management access to a level 2 (L2) switch that includes one or more first ports configured to couple the L2 switch to other switches, the method comprising:
   receiving a request to establish a remote management session from a user operable remote management terminal through a network access port, the network access port being independent of the first ports;
   packaging information from a plurality of central processing units (CPUs) of the L2 switch into network packets, the CPUs being coupled to the first ports via a network processing unit (NPU), and the information being received via serial ports of the CPUs and over couplings without hardware switches in between;
   transmitting the network packets over an internet protocol through a medium access controller (MAC) independent of the NPU and the network access port to the remote management terminal;
   receiving management information packets from the remote management terminal at the network access port;
   unpacking management information from the received management information packets;
   converting the management information into serial management information; and
   providing the serial management information to a particular CPU among the plurality of CPUs, the particular CPU being designated in the management information packet.

13. The method according to claim 12, wherein the network packets comprise user datagram protocol (UDP) network packets.

14. The method according to claim 12, wherein the management information comprises Intelligent Platform Management Interface (IPMI) management messages.

15. The method according to claim 12, wherein converting the management information into serial management information comprises processing the management information using a baseband management controller of the L2 switch.

16. The method according to claim 12, wherein receiving management information packets comprises receiving the management information packets in a baseband management controller of the L2 switch over a side-band coupling from the MAC.

* * * * *